United States Patent [19]

Wray

[11] 4,161,758
[45] Jul. 17, 1979

[54] LOOP FORMING AUDIO DRIVE
[75] Inventor: William R. Wray, Sudbury, Mass.
[73] Assignee: Polaroid Corporation, Cambridge, Mass.
[21] Appl. No.: 899,864
[22] Filed: Apr. 25, 1978
[51] Int. Cl.² .................... G03B 23/12; G03B 31/02
[52] U.S. Cl. ....................................... 360/90; 352/27
[58] Field of Search ............................. 360/90–92, 360/93, 95, 130, 128; 352/14, 27, 72

[56] References Cited
U.S. PATENT DOCUMENTS

| | | | |
|---|---|---|---|
| 3,155,778 | 11/1964 | Meyer | 360/90 |
| 3,832,044 | 8/1974 | Deeran | 352/14 |
| 3,850,512 | 11/1974 | Scholz | 352/14 |
| 3,873,993 | 3/1975 | Staar | 360/105 |
| 4,093,362 | 6/1978 | Kato | 352/27 |

Primary Examiner—John H. Wolff
Attorney, Agent, or Firm—David R. Thornton

[57] ABSTRACT

An audio drive system having a pinch roller mounted in slightly trailing arrangement to the point of the initial engagement of the audio tape with the capstan so that, as the audio tape passes from the pinch roller and capstan, it is displaced from the original tape path to curl into a free loop and provide isolation between the continuous motion of the audio tape and the intermittent advancement for photographic motion.

3 Claims, 1 Drawing Figure

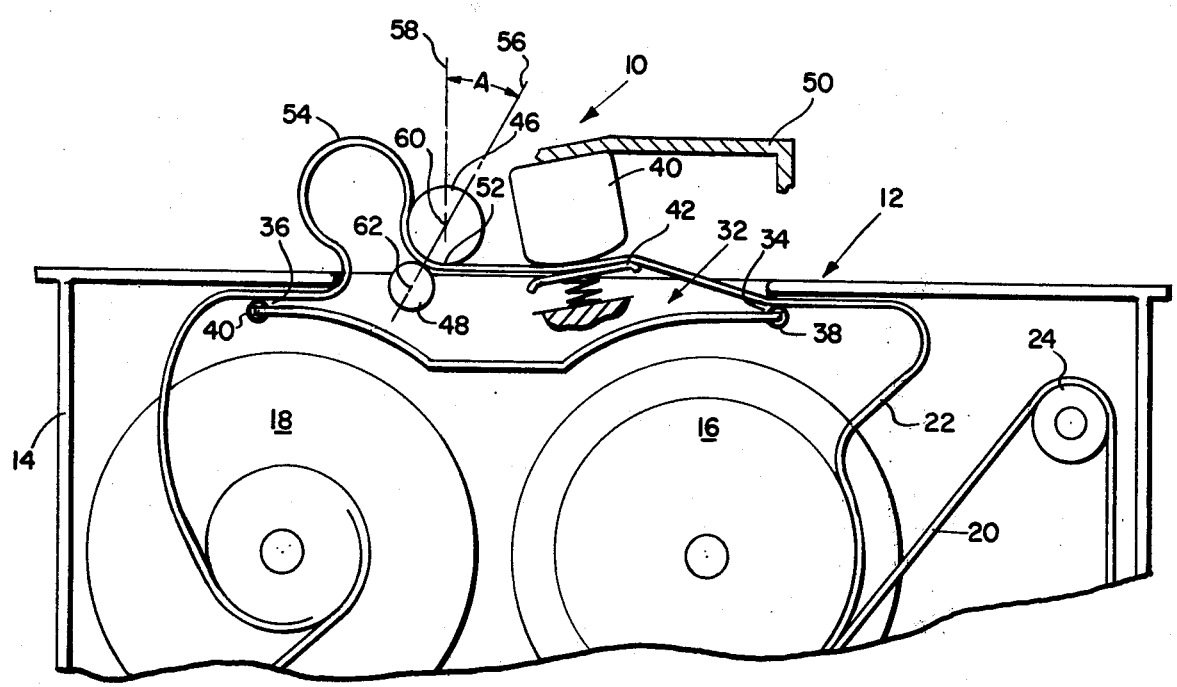

LOOP FORMING AUDIO DRIVE

BACKGROUND OF THE INVENTION

This invention relates to audio drive systems and more particularly to an audio drive system for audio-visual cassette arrangement.

In audio-visual systems, it is necessary to isolate the intermittent photographic motion from the continuous audio motion. Conventionally, such isolation is accomplished by forming an isolation loop in the tape or film to permit repeated, intermittent take-up of the slack in the loop without effecting the continuous motion past the transducer head and capstan. Such isolation loops are provided by a variety of means which, unfortunately, often require complex mechanical devices, not ideally suited to sound drive systems designed for use with self-contained audio-visual cassettes.

Consequently, it is an object of this invention to provide an audio drive system including a loop forming arrangement. A further object of this invention is to provide a capstan drive arrangement which substantially, inherently provides a free tape or film loop.

SUMMARY OF THE INVENTION

Briefly, the invention provides a tape drive arrangement, including a capstan and pinch roller mounted in cooperative arrangement so that the tape is thrown into a free loop as it passes from engagement with the capstan and roller. In this arrangement, the tape is advanced across an audio transducer head so as to extend in a given plane towards engagement with the capstan, and the pinch roller is mounted in trailing relation to the capstan, as viewed in the direction of tape advancement, so that the tape is carried around the capstan, displaced out of the given plane and into a free loop.

BRIEF DESCRIPTION OF THE DRAWING

The normal features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same part and wherein FIG. 1 is a view in elevation of a tape drive system of the invention in conjunction with an audio-visual cassette with portions cut away to reveal the interior of both.

DESCRIPTION OF THE ILLUSTRATED EMBODIMENT

In the drawing an audio recording and playback system 10 is shown in operable engagement with an audio film cassette 12 of the type as shown and described in U.S. patent application Ser. No. 869,131 filed on Jan. 13, 1978 in the name of Edwin H. Land et al, wherein an audio-visual cassette system is described in which a film strip and magnetic tape are commonly interwound on a supply spool and a takeup spool.

The cassette 12 is similar to the embodiment shown in FIG. 8 of the above-noted application and comprises a substantially parallelepiped housing 14 having a supply spool or reel 16 and a takeup spool or reel 18 to which opposite ends of a pair of elongated strips or webs 20 and 22 are attached. One web 20 comprises a photographic film strip which extends from the supply spool 16 around an idler roller 24 through an exposure station (not shown) and to the supply spool 16. In a similar manner, the web 22 comprises a tape, carrying audio recording material, such as magnetic stripes in a central portion, which extends from the supply spool 16 beneath the top surface 28 of the cassette housing 14 and to the supply spool 18.

In its passage from the supply spool 16 to the takeup spool 18, the tape 22 extends through an audio station 32 which consists of a pair of openings 34 and 36 through which the tape extends so as to provide access to the audio system 10. Hence, the openings 34 and 36 provide means in the cassette for permitting access of audio components to the tape. In this arrangement, a pair of members 38 and 40 are located adjacent the openings 34 and 36 respectively so as to provide light film drag or a turning point which aids in producing a free film loop.

Mounted on the cassette 12 is the audio recording and playback system 10 comprising a transducer 40 with a support pad 42, a capstan 46 and a pinch roller 48. The pinch roller 48 and the pad 42 are mounted for displacement towards or away from the capstan 46 and the head 40 in a conventional arrangement to permit engagement of these components with the portion of the tape 22 which extends through the audio station. In this regard, as explained in the above-noted copending application, the system 10 is intended to be a permanent portion of a camera or either a permanent portion of a projector system or accessory thereof, and would include audio reproduction and/or playback circuitry and components, such as, for example, a microphone or speaker (not shown) which cooperates with the transducer head 40.

The audio components are mounted on a support, partially shown at 50, such that the pinch roller 48 and the pad 42 may be displaced towards the capstan 46 and the head 40 once the system 10 is positioned with respect to the cassette 12. That is, the roller and pad 42 are displaced from their respective components and slid into place beneath the web 22 during or just after positioning of the cassette within appropriate apparatus. To facilitate the positioning of the pinch roller and pad beneath the tape, means (not shown) such as a finger member may be utilized to lift the tape slightly at this time. In an alternate arrangement, the leading and trailing ends of the tape 22 may be reinforced or stiffened as to provide a slight arc in the audio station 32 when the cassette is at either end of its tape run.

Both the capstan 46 and the pinch roller 48 are rotatably mounted on the support 50, and the capstan 46 is adapted to be driven, for example, by a motor (not shown) to advance the tap when in engagement therewith.

In the novel arrangement, the head 40 and pad 42 are constructed so that the tape 22 extends therefrom so as to lie in a given plane tangential to the capstan at the point, designated at 52. The pinch roller 48 is mounted forwardly, as viewed in the direction of tape travel of this point 52 so that the tape is carried, upwardly in the FIG. 1, from the tangential point 52 and thereby displaced out of this plane and into a free loop designated at 54. The formation of the loop 54 is also facilitated by retarding slightly the feeding of the tape 22 to the takeup spool 18. This is accomplished by forcing the tape to turn as it feeds from the loop 54 back to the cassette; the latter being facilitated by the post 40. In this regard, what is important is that the loop 54 does not have a free fall or straight path from the loop to the takeup spool 18 so that the latter must, in effect, pull the tape from the loop back into the cassette.

In this arrangement, the plane 56 passing through the center 60 of the capstan 46 and the center 62 of the pinch roller 48 is pivoted or rotated with respect to the plane 58 which passes through the capstan center 60 and the tangential point 52 between the tape 22 and the capstan. Preferably, the angle between these planes 58 and 56 would be in the order of 15-30° but may range from 10-90° or more. Hence, this displacement of, or mounting of, the pinch roller in a trailing arrangement to the initial point of tangency of the tape and capstan displaces the tape from its initial plane into a free loop following its passage between the pinch roller and the capstan.

Those familiar with audio tape systems and sound motion picture parts will readily appreciate the novel and highly unique advantages of the described audio drive system which provides its own free loop. Advantageously, the mounting of the pinch roller out of the plane of the tape facilitates displacing the tape from this plane and into a free loop.

This invention may be practiced or embodied in still other ways without departing from the spirit or essential character thereof. The preferred embodiment described herein is therefore illustrative and not restrictive, the scope of the invention being indicated by the apending claims and all variations which come within the meaning of the claims are intended to be embraced therein.

What is claimed is:

1. A tape drive mechanism having a capstan and pinch roller arrangement for drawing an audio tape in a given direction across an audio transducer and then into a free loop in a audio-visual system, the system including means for retarding the feeding of the tape after it advances from the capstan, the capstan being located in a downstream relation to the transducer, as viewed in the given direction of tape advancement, and arranged with respect to the transducer such that the tape lies in a given plane as it approaches the capstan, the improvement wherein the pinch roller is mounted in a downstream relation to the initial point of tangency of the tape with the capstan so that the tape is carried partially around the capstan and thereby displaced from the given plane as it emerges from contact with the roller and capstan to thereby form a loop in the emerging tape portion the pinch roller being mounted in relation to the capstan so that a plane passed through the center of said capstan and the initial point of tangency between the given tape plane and the capstan is at an angle greater that 10 degrees to a plane passed through the center of the capstan and the center of the pinch roller, and thereby maintain said loop in the emerging tape portion throughout operation of said tape drive mechanism.

2. A tape drive mechanism for use with an audio-visual cassette for advancing an audio tape retained therein in a given direction across an audio transducer, the tape being retained within the cassette with opposite ends thereof respectively connected to cassette supply and takeup spools, the cassette also including an opening for providing access to the tape, means for guiding the tape across the cassette opening as it is advanced in the given direction from the supply to the takeup spool, and means adjoining the takeup spool for retarding feeding of the tape from the opening to the takeup spool, said mechanism having a capstan and a pinch roller for urging said tape into capstan engagement and thereby advance the tape in accordance with capstan rotation, the capstan being located in downstream relation to the transducer, as viewed in the given direction of tape advancement, such that the tape is drawn across the transducer by the capstan, and the transducer and capstan being arranged such that the tape lies in a given plane as it approaches the capstan, the improvement wherein the pinch roller is mounted in a downstream relation to the initial point of tangency of the tape with the capstan so that the tape is carried partially around the capstan and displaced from the given plane as it emerges from contact with the roller and capstan to thereby form a loop in the emerging tape portion the pinch roller being mounted in relation to the capstan so that a plane passed through the center of said capstan and the initial point of tangency between the given tape plane and the capstan is at an angle greater than 10 degrees to a plane passed through the center of the capstan and the center of the pinch roller, and thereby maintain said loop in the emerging tape portion throughout operation of said tape drive mechanism.

3. The improvement of claims 1 or 2 wherein said angle is in the order of 15-30°.

* * * * *